(12) United States Patent
Barclay

(10) Patent No.: US 6,612,792 B2
(45) Date of Patent: Sep. 2, 2003

(54) WORK TABLE HAVING TOOL COUNTERBALANCING MEANS

(75) Inventor: Dwaine Barclay, Calgary (CA)

(73) Assignee: CAM Tech Industries Inc., Calgary (CA)

( * ) Notice: Subject to any disclaimer, the term of this patent is extended or adjusted under 35 U.S.C. 154(b) by 0 days.

(21) Appl. No.: 09/843,039

(22) Filed: Apr. 25, 2001

(65) Prior Publication Data

US 2002/0159853 A1 Oct. 31, 2002

(51) Int. Cl.[7] .............................. B23C 9/00; B27B 5/06
(52) U.S. Cl. ..................... 409/237; 83/471.3; 83/486.1; 83/859; 144/286.1
(58) Field of Search ..................... 409/237; 451/906, 451/343; 83/615, 486.1, 471.3, 859; 144/286.1

(56) References Cited

U.S. PATENT DOCUMENTS

| | | | | |
|---|---|---|---|---|
| 2,973,020 A | * | 2/1961 | Bennett | 83/471.3 |
| 3,565,139 A | * | 2/1971 | Olson et al. | 83/859 |
| 3,866,496 A | * | 2/1975 | Payne et al. | 83/471.3 |
| 4,181,054 A | * | 1/1980 | Striebig | 83/153 |
| 4,283,929 A | | 8/1981 | Heiberger | |
| 4,631,999 A | * | 12/1986 | Striebig | 83/455 |
| 4,705,438 A | * | 11/1987 | Zimmerman et al. | 108/9 |
| 4,802,399 A | * | 2/1989 | Olson | 384/55 |
| 4,886,174 A | | 12/1989 | Leveugle | |
| 4,969,344 A | | 11/1990 | Hinterman et al. | |
| 5,046,233 A | * | 9/1991 | Shoda | 483/32 |
| 5,316,273 A | | 5/1994 | Vaphiadis | |
| 5,560,733 A | | 10/1996 | Dickinson | |
| 5,582,088 A | * | 12/1996 | Harter | 83/468.4 |
| 5,806,245 A | | 9/1998 | Satrom | |
| 6,055,777 A | | 5/2000 | Rekioja | |

FOREIGN PATENT DOCUMENTS

CA          1267661          4/1990

* cited by examiner

*Primary Examiner*—William Briggs
(74) *Attorney, Agent, or Firm*—Pillsbury Winthrop LLP

(57) ABSTRACT

The present invention provides a work table for use with a tool, comprising an inclined work surface, which is substantially planar and is supported by a frame having a base; a gantry movably attached to the work surface and having two ends, a longitudinal axis and extending within a plane parallel to the work surface; a movable tool mount slidably attached to the gantry for removable attachment of the tool wherein the tool mount and the tool have a combined effective weight; a first movement means attached to one end of said gantry for translation of the gantry over said work surface; a second movement means attached to the tool mount for translation of said tool between the ends of the gantry; and a weight counterbalancing means operatively associated with the tool mount for neutralising the combined effective weight. Neutralisation of the weight is accomplished by attaching the tool mount to a counterbalancing system that counterbalances the combined effective weight of the tool and tool mount along the length of the gantry, enabling its smooth movements when the work surface is in an inclined position.

18 Claims, 4 Drawing Sheets

WORK TABLE HAVING TOOL COUNTERBALANCING MEANS

FIELD OF THE INVENTION

The present invention relates generally to work tables and more particularly to an inclined work surface with a movable tool mount and counterbalancing system.

BACKGROUND

There are several types of supporting tables that have been suggested for the use of tools, with these tables providing support for these tools on the surface of the table or by connection to the underside of the table. Typically, these tables comprise a flat, generally horizontally extending top, which is supported by legs. The top of a supporting table typically has an upper planar surface which supports the item to be shaped and an under surface to which the tool may be attached. These horizontally extending tables require a large amount of floor space in order to be installed, thus drastically reducing the available work area. Furthermore, these tables typically require disassembly in order to relocate them from one room to another due to restrictions of, for example, the size of a doorway.

By inclining a supporting table the resulting floor footprint of the table is dramatically reduced when compared to that of a horizontal table having the same surface area. By inclining the supporting table, however, the tool which may typically be manoeuvred on a plane parallel to the surface of the supporting table, will be operating at an inclined angle. A gantry on a horizontal working table typically supports the weight of the tool being used, however this support is decreased if the working table is inclined.

As a result of the inclination of the table, the required applied vertical force in order to translate the tool in a vertical direction will be increased, while the applied force required for horizontal translation of the tool will remain relatively unchanged. Thus there will be a variation in the required applied force necessary to move the tool, depending on the direction of the translation. This variation in the applied force may result in unsteady movement of the tool resulting in uneven shaping of the item being prepared.

Typically, in order to reduce the applied force necessary to move an object vertically, a counterbalance system is incorporated into the apparatus. A typical method of counterbalancing an object is achieved by the suspension of a weight using a pulley mechanism such that this additional weight counteracts the weight of the object. This technique requires a plurality of varying weights providing a means for the adjustment of the counter weight enabling the counterbalancing of objects of varying weights. U.S. Pat. No. 5,806,245 describes the use of this method as applied to the opening of a lift gate. In this example the counterweight was adjusted such that the full weight of the lift gate was compensated enabling the user to easily move the lift gate in a vertical direction.

Furthermore, pneumatic means have been used, for example, to open and close gates, doors and windows, for example. U.S. Pat. No. 5,806,245 also describes a pneumatic means enabling the opening and closing of a lift gate, with the volume of the air within the system being controlled by a switch operated by a user. The force created within the pneumatic means is transmitted to the lift gate by a conventional pulley system. As the air volume within the pneumatic means increases the gate will rise and as the air volume within said means decreases the gate will lower. This pneumatic means was used to open and close the gate only and the pressure within said pneumatic means is not regulated to compensate for the full weight of the lift gate enabling the user to easily move the gate in a vertical direction.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a work table having tool counterbalancing means. In accordance with an aspect of the present invention, there is provided an inclinable apparatus for use with a tool, comprising: an inclined work surface which is substantially planar and is supported by a frame having a base; a gantry movably attached to said work surface and having two ends, a longitudinal axis and extending within a plane parallel to the work surface; a movable tool mount slidably attached to said gantry for removable attachment of the tool wherein the tool mount and the tool have a combined effective weight; a first movement means attached to one end of said gantry for translation of the gantry over said work surface; a second movement means attached to the tool mount for translation of said tool between the ends of the gantry; and a weight counterbalancing means operatively associated with said tool mount for neutralising the combined effective weight.

In accordance with another aspect of the invention, there is provided an inclinable apparatus for use with a tool, comprising: an inclined work surface which is substantially planar and is supported by a frame having a base; a gantry movably attached to said work surface and having two ends, a longitudinal axis and extending within a plane parallel to the work surface; a movable tool mount slidably attached to said gantry for removable attachment of the tool wherein the tool mount and the tool have a combined effective weight; a first movement means attached to one end of said gantry for translation of the gantry over said work surface; a second movement means attached to the tool mount for translation of said tool between the ends of the gantry; and a weight counterbalancing means operatively associated with said tool mount for neutralising the combined effective weight, wherein said counterbalancing means is connected to the gantry such that the gantry and counterbalancing means translate over said work surface as a single unit.

DETAILED DESCRIPTION OF THE INVENTION

Definitions

The term "inclined vertical axis" is used to describe the axis which is parallel to the inclination of the work surface along which the counterbalancing force acts.

The term "effective weight" is used to describe the force component of the gravitational weight along the inclined vertical axis.

The term "tool" is used to describe a device where the operation of said device would be affected by the inclination of the surface upon which it is used, such as but not limited to a router, panel saw, laser, paint or ink applicator and sampling device.

The term "tool mount" is used to describe a device which allows attachment of a tool to the apparatus of the present invention such that the tool is oriented in an operational position. It would be readily appreciated by a worker skilled in the art that the tool can be removably or permanently attached via the tool mount.

Unless defined otherwise, all technical and scientific terms used herein have the same meaning as commonly understood by one of ordinary skill in the art to which this invention belongs.

The present invention provides a work table for use with a tool, comprising an inclined work surface, which is substantially planar and is supported by a frame having a base; a gantry movably attached to the work surface and having two ends, a longitudinal axis and extending within a plane parallel to the work surface; a movable tool mount slidably attached to the gantry for removable attachment of the tool wherein the tool mount and the tool have a combined effective weight; a first movement means attached to one end of said gantry for translation of the gantry over said work surface; a second movement means attached to the tool mount for translation of said tool between the ends of the gantry; and a weight counterbalancing means operatively associated with the tool mount for neutralising the combined effective weight.

Neutralisation of the weight is accomplished by attaching the tool mount to a counterbalancing system that counter-balances the combined effective weight of the tool and tool mount along the length of the gantry, enabling its smooth movements when the work surface is in an inclined position.

In the apparatus of the present invention, the effective weight of the tool along the length of the gantry is zero when the work surface is in the horizontal position. As the work surface is raised to an inclined position, the effective weight of the tool along the length of the gantry increases, rendering the ability to support and raise the tool along the length of the gantry (the inclined vertical axis) increasingly difficult. The counterbalancing means of this invention generates a force equal in magnitude to counter-act the combined effective weight of the tool and tool mount along the length of the gantry (the inclined vertical axis), wherein the generated counter-force is applied by a flexible line attached to the tool mount, wherein said flexible line is carried by a pulley.

Figure 1:
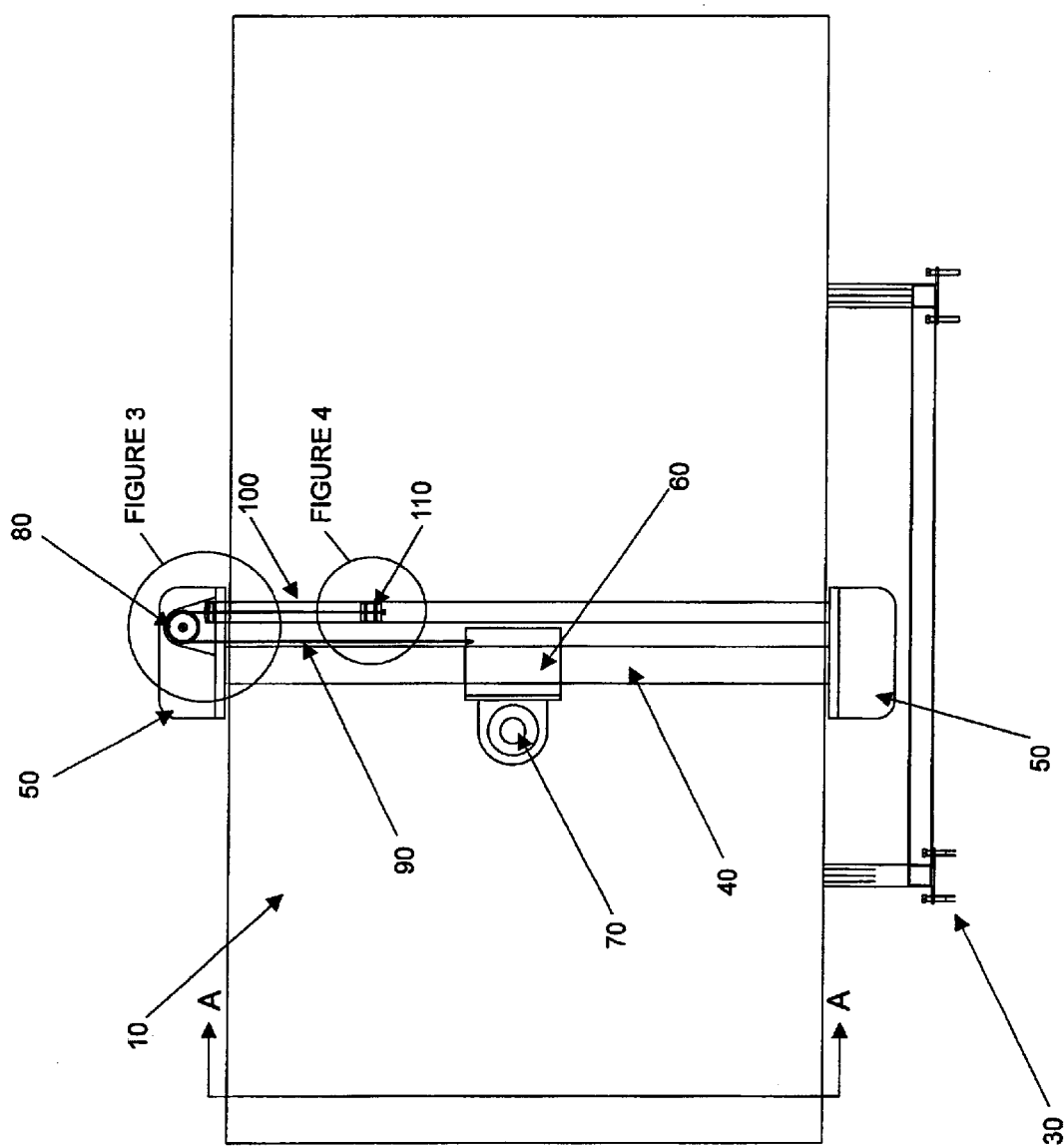
FIG. 1 provides a front elevation view of one embodiment of the present invention.
Figure 2:
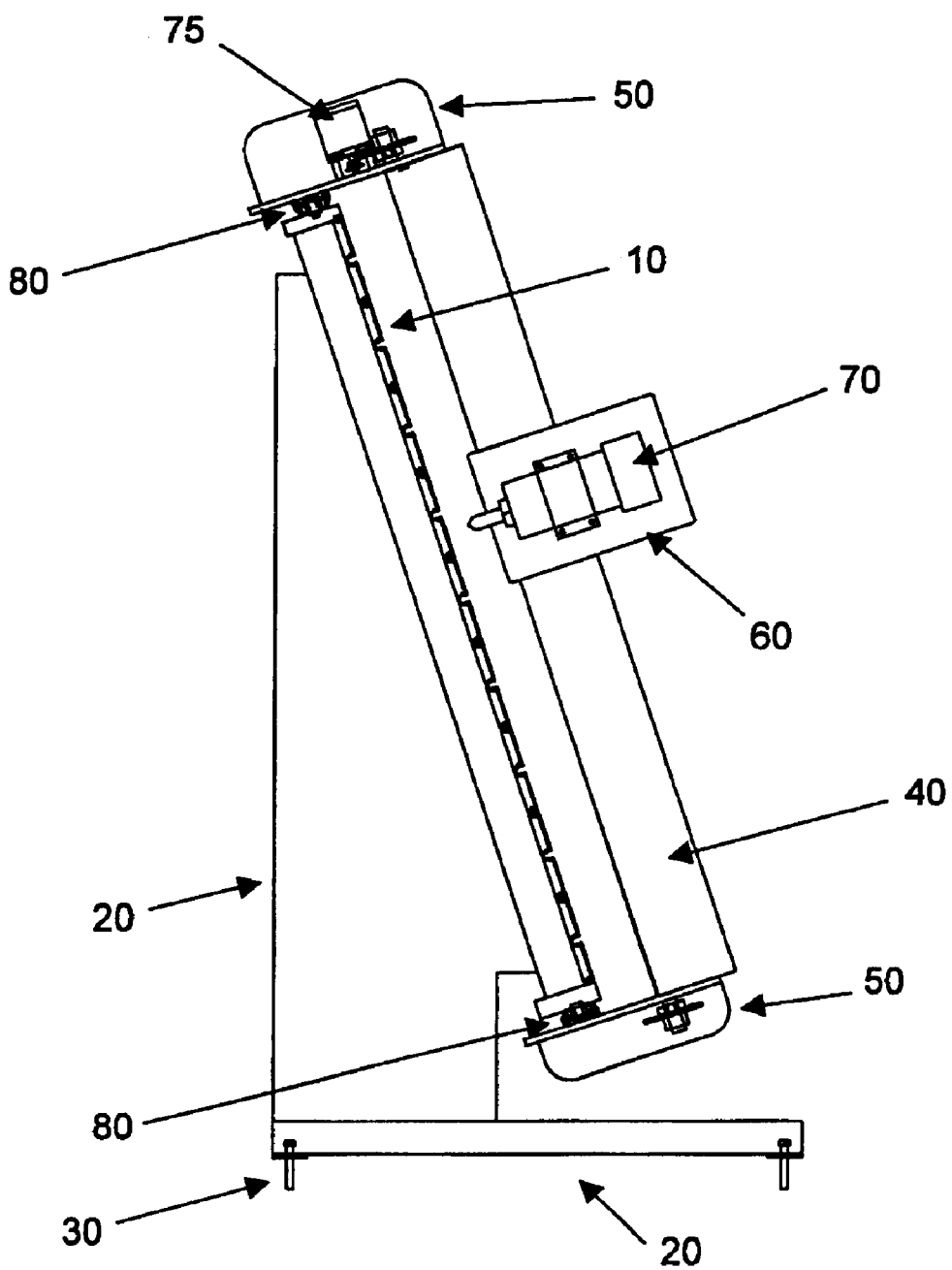
FIG. 2 provides a cross-section view along axis A—A as indicated in FIG. 1.

One embodiment of the present invention is illustrated in FIGS. 1 and 2, in front elevation and side elevation views, respectively.

In an exemplary embodiment and with reference to FIGS. 1 and 2, the apparatus is mobile with this mobility being provided by a rolling mechanism 30, for example casters or wheels which are connected to the base of a supporting frame 20. The inclination of a work surface reduces the floor footprint of the apparatus and thus there is a reduction in the floor area required to set-up said apparatus as compared to a horizontal work surface having the same surface area. Furthermore, by inclining the work surface 10 the apparatus may be able to move through standard doors, resulting in easy relocation of said apparatus.

In a further embodiment of the present invention the supporting frame may be constructed such that the inclination of the work surface may be adjusted depending on the preference of the user. This adjustment of the inclination of the work surface may be performed by a variety of means, for example manual, mechanical or electrical as would be known to a worker skilled in the art.

Gantry

In one embodiment of the present invention and with further reference to FIGS. 1 and 2, the gantry comprises a main elongated tubular member 40, end caps 50 and a tool mount 60. Although it is not necessarily so, the components of the gantry can be designed such that the tool 70 is able to reach all corners of the inclining work surface 10. In a related embodiment the elongated tubular member spans the width of the work surface.

A tool mount 60 is connected to the elongated tubular member 40 such that the tool mount 60 is able to move smoothly and freely along said elongated tubular member 40. For example, the tool mount can incorporate a collar which can be mounted on the elongated tubular member, providing a means for said member to guide the translation of the tool mount along its length (along the inclined vertical axis). The smooth and free movement of the tool mount 60 along the elongated tubular member 40 may be provided by a plurality of guide bearings, or any other friction reduction means, for example various lubricants.

In one embodiment of the present invention, the tool is firmly attached to the tool mount using adjustable brackets, or any other means that can firmly connect the tool to the tool mount.

In one embodiment of the present invention and with further reference to FIG. 1, an end cap 50 is rigidly connected to each end of the elongated tubular member 40 providing a means for the attachment of the gantry to the inclined work surface 10 and supporting frame 20. Said attachment facilitates the smooth and free movement of the gantry over the work surface, for example, parallel to the floor. In one embodiment of the invention, a guide rail 80 is provided along the top and bottom of the inclined work surface 10. The smooth and free movement of the gantry along said guide rails may be provided by a plurality of guide bearings. A variety of alternate guiding means providing the smooth and free horizontal movement of the gantry would be know to one skilled in the art.

A tool connected to the tool mount is capable of freely moving along the length of the elongated tubular member of the gantry and together with the gantry, over the work surface such that the tool can translate over a defined area of the work surface. In one embodiment of the present invention the defined area is the entire work surface.

In one embodiment of the present invention the translation of the tool is controlled by a computing system. This computing system controls a series of electrical means, for example speed reduction motors, which provide a means for the movement of the tool using a gearing mechanism. One electrical means controls the movement of the gantry over the work surface and another electrical means controls the movement of the tool mount along the length of the elongated tubular member. In one embodiment, a further electrical means may be installed to enable the movement of the tool in a direction perpendicular to the plane of the inclining work surface, with this electrical means being incorporated into the tool mount assembly. The control of the movement of the tool using electrical means would be known to a worker skilled in the art of CAD/CAM systems (computer aided design/computer aided manufacturing). For example, a CAD/CAM system provides a means for a designer to create a virtual representation of the object to be manufactured using a computer, with said computer subsequently creating a set of instructions for the system to manufacture the desired object.

In would be readily apparent to a worker skilled in the art that it would be possible to move the gantry and tool mount without the need for addition of means to control movement. In such a configuration the gantry and/or tool mount are moved manually. Optionally manual movement of the gantry or tool mount can be facilitated using fixed movement means, for example a handle.

Due to the inclination of the work surface, the applied force required to move the tool along the inclined vertical axis will be greater than that required to move the tool perpendicular to said axis. This inequality of required translational forces may result in unsteady movement of the tool, possibly resulting in uneven cutting of the piece being shaped.

The counterbalancing means of the present invention, counter acts the combined effective weight of the tool and the tool mount along the inclined vertical axis. This counterbalancing force remains constant independent of the position of the tool over the work surface. Furthermore, this counterbalancing means enables equilibration of the required applied force for the translation of the tool in any direction over the work surface.

Counterbalancing Means

Figure 3:
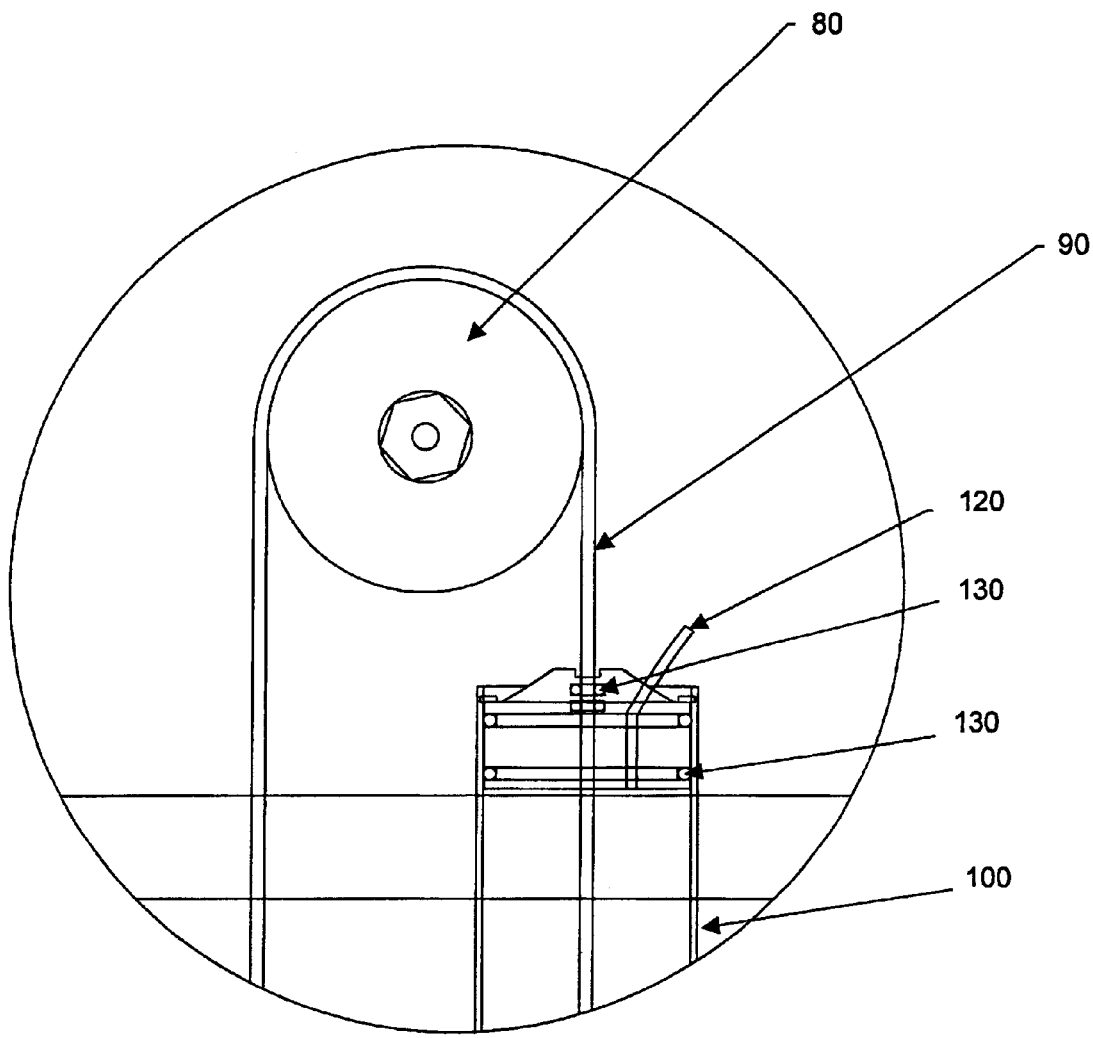
FIG. 3 provides a schematic of one end of the pneumatic cylinder and a portion of the pulley mechanism, of the apparatus shown in FIG. 1.
Figure 4:
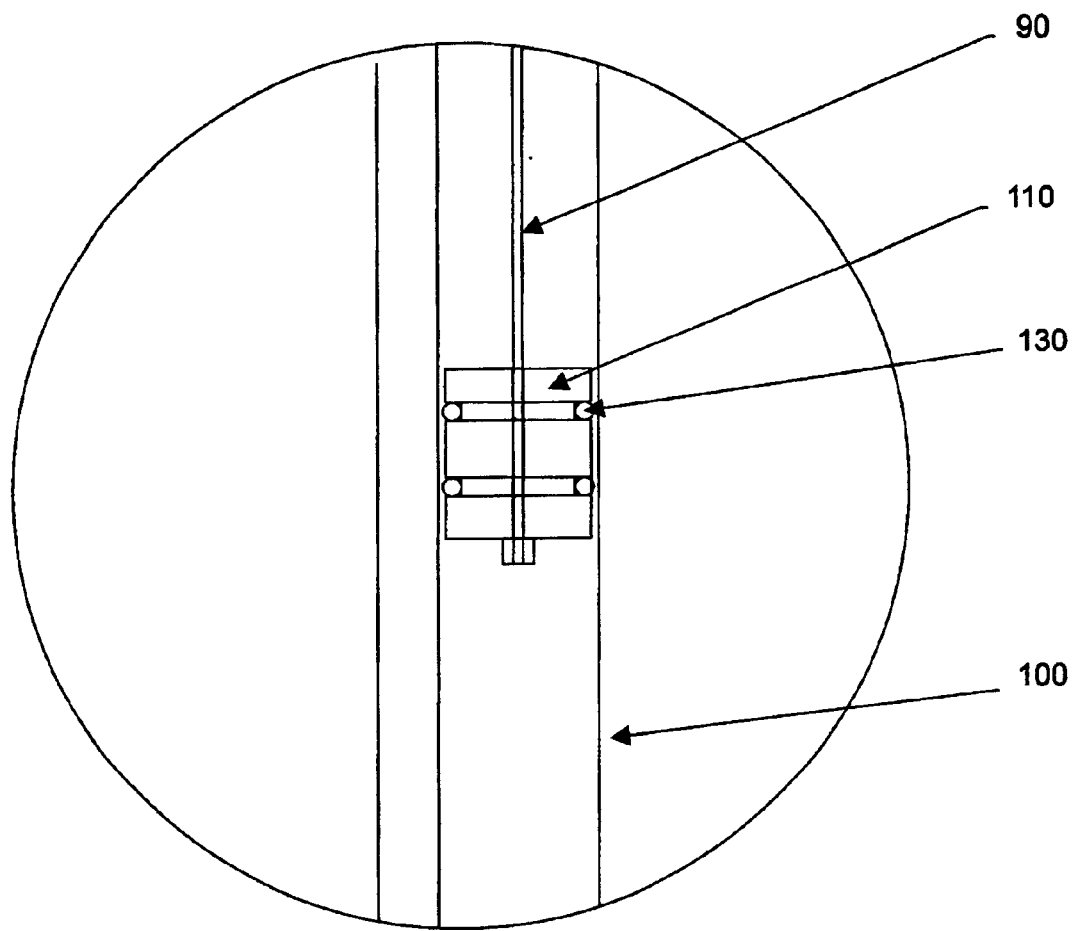
FIG. 4 provides a schematic of the internal components of the pneumatic cylinder, shown in FIG. 1, including the piston and flexible line attachment.

In one embodiment of the present invention and with reference to FIGS. 1, 3 and 4, the counterbalancing means incorporates a pulley mechanism comprising a pulley 80 and a flexible line 90, a pneumatic cylinder 100 and a pressure controlling system.

The flexible line 90, which is carried by a conventional pulley 80, is connected to the piston 110 within the pneumatic cylinder 100 at one end and the tool mount 60 at the other end. The pressure within the pneumatic cylinder 100 is monitored by a pressure sensor, with the pressure control system initiating the insertion or removal of air from the pneumatic cylinder through a valve 120 such that a predetermined internal pressure within the pneumatic cylinder is maintained. A pressure sensor monitors the pressure within said cylinder such that a constant pressure is maintained within the cylinder at all times.

In one embodiment of the present invention, a safety valve can be installed within the pneumatic cylinder enabling the release of excess pressure within the pneumatic cylinder, for example, if the pressure control system fails and is unable to regulate an increase in pressure within said pneumatic cylinder.

In an exemplary embodiment and with further reference to FIG. 1, the pulley mechanism and the pneumatic cylinder are attached to the gantry, providing a means for these components to move as a single unit over the work surface. The tool 70 and tool mount 60 are counterbalanced by a flexible line 90 such as a cable which is connected to the tool mount 60 and which is carried by a conventional pulley 80 mounted near the top end of the elongate tubular member 40. The flexible line 90 extends through an opening in the top of the pneumatic cylinder 100 and is attached to a piston 110, which is movably disposed inside the pneumatic cylinder 100. Thus the movement of the tool 70 and tool mount 60 is directly linked to the movement of the piston 110. As the tool 70 and tool mount 60 translate along the length of the elongated tubular member 40, the piston 110 will translate a corresponding distance within the pneumatic cylinder 100, altering the volume of the air within the pneumatic cylinder 100. This translation of the piston 110 results in a pressure change within the pneumatic cylinder 100, with said pressure being monitored by a pressure sensor.

For example, upon detection of a decrease of the internal pressure within the pneumatic cylinder by the pressure sensor, the pressure control system will initiate the insertion of compressed air from a compressed air source such as an air compressor into the pneumatic cylinder through a valve. This insertion of air will continue until the internal air pressure has reached the desired level. Conversely, the pressure control system, upon detection of an increase in the pressure within the pneumatic cylinder by the pressure sensor, will bleed air from the pneumatic cylinder through the valve until the internal air pressure has decreased to the desired level. A pneumatic cylinder pressure in excess of that desired may cause the tool to rise and conversely the tool may fall if the pneumatic cylinder pressure is below that which is required. The pressure sensor which is attached to the valve and monitors the pressure within the pneumatic cylinder, is sufficiently sensitive such that the required internal pressure within the pneumatic cylinder will be maintained by the pressure control system, to within for example, ±0.05 psi of the pre-selected pressure. There are a variety of pressure control systems which are capable of providing this level of sensitivity with one such system being manufactured by NUMATICS™.

The required speed of response of the pressure control system to a change in the internal pressure of the pneumatic cylinder is directly linked to the translational speed at which the tool is being moved. For example, rapid movement of the tool will result in sudden changes in the volume of the air chamber within the pneumatic cylinder and thus the regulation of the internal pressure within said cylinder must be equilibrated at a faster rate in order to maintain a consistent counterbalancing force.

The pulley mechanism transmits the force generated within the pneumatic cylinder to the tool mount and thus counterbalances the combined effective weight of the tool and tool mount along the inclined vertical axis. The force transmitted via the flexible line is equivalent to the pressure within the pneumatic cylinder times the surface area of the piston. Thus, by maintaining a constant pressure within the pneumatic cylinder, even during volumetric changes of the air chamber within said pneumatic cylinder, a constant counterbalancing force will be exerted on the tool.

By counterbalancing the combined effective weight of the tool and tool mount, the required power associated with an electrical means that translate the tool along the length of the length of the elongated tubular, is reduced. Furthermore, this counterbalancing means may reduce the wear of the components of the electrical means due to the reduction of the weight being translated in comparison to a situation in which the tool is translated in the absence of the counterbalancing means.

In one embodiment of the present invention the desired pneumatic cylinder pressure is determined based upon the effective weight, along the inclined vertical axis, of the tool to be counterbalanced together with the tool mount. The pressure within the pneumatic cylinder may be systematically increased until the tool and tool mount reach a state of weight neutrality. At this point the combined effective weight of the tool and tool mount is completely counter acted by the counterbalancing mechanism, as such the tool will remain at a constant position until movement of said tool and tool mount, is initiated. Upon the determination of the required internal pneumatic cylinder pressure, the pressure sensor is calibrated to this value for the subsequent operation of the tool.

In one embodiment of the present invention and with further reference to FIGS. 3 and 4, the apparatus comprises sealing means 130 located on the piston 110, the top of the pneumatic cylinder 100 and the entry location of the flexible line 90 into the pneumatic cylinder 100. An example of such a sealing means includes what are known in the art as "O rings" or any other sealing means, which result in similar sealing qualities. These sealing means 130 provide the air seal between the piston 110 and the internal wall of the pneumatic cylinder 100, with said sealing means 130 attached directly to the piston 110 enabling the movement of the piston 110 within the pneumatic cylinder 100 while maintaining said pressure seal. Similar sealing means 130 are installed at the entry point of the flexible line 90 into the pneumatic cylinder 100, enabling the sealing of the pneumatic cylinder 100 during the movement of the flexible line 90.

The present invention provides a means for counterbalancing the combined effective weight of a tool and tool mount, which is being used in conjunction with an inclined work surface. By counteracting the combined effective weight of the tool and tool mount using pneumatic means, the varying weights of the tools operated using the present invention are counterbalanced by simply adjusting the internal pressure within the pneumatic cylinder.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. A work table for use with a tool, comprising:
   a) an inclined work surface which is substantially planar and is supported by a frame having a base;
   b) a gantry movably attached to said work surface and having two ends, a longitudinal axis and extending within a plane parallel to the work surface;
   c) a movable tool mount slidably attached to said gantry for removable attachment of the tool wherein the tool mount and the tool have a combined effective weight; and
   d) a pneumatic weight counterbalancing means operatively associated with said tool mount for neutralising the combined effective weight.

2. A work table for use with a tool, comprising:
   a) an inclined work surface which is substantially planar and is supported by a frame having a base;
   b) a gantry movably attached to said work surface and having two ends, a longitudinal axis and extending within a plane parallel to the work surface;
   c) a movable tool mount slidably attached to said gantry for removable attachment of the tool wherein the tool mount and the tool have a combined effective weight;
   d) a first movement means attached to one end of said gantry for translation of the gantry over said work surface;
   e) a second movement means attached to the tool mount for translation of said tool and said tool mount between the ends of the gantry; and
   f) a pneumatic weight counterbalancing means operatively associated with said tool mount for neutralising the combined effective weight, wherein said counterbalancing means is connected to the gantry such that the gantry and counterbalancing means translate over said work surface as a single unit.

3. A work table for use with a tool, comprising:
   a) an inclined work surface which is substantially planar and is supported by a frame having a base;
   b) a gantry movably attached to said work surface and having two ends, a longitudinal axis and extending within a plane parallel to the work surface;
   c) a movable tool mount slidably attached to said gantry for removable attachment of the tool wherein the tool mount and the tool have a combined effective weight;
   d) a first movement means attached to one end of said gantry for translation of the gantry over said work surface;
   e) a second movement means attached to the tool mount for translation of said tool and said tool mount between the ends of the gantry; and
   f) a pneumatic weight counterbalancing means operatively associated with said tool mount for neutralising the combined effective weight.

4. The work table as described in claim 3, wherein said pneumatic weight counterbalancing means comprises:
   a) a pneumatic tube adapted to receive and release compressed air;
   b) a piston sealably disposed within said pneumatic tube and movable between a first and a second position;
   c) a pulley mechanism comprising a pulley and a flexible line wherein said flexible line is carried by the pulley and has a first and second end, and wherein said first end is attached to the tool mount and wherein said second end is attached to the piston;
   d) a pressure control means for regulating the pressure within the pneumatic tube, such that a constant pressure is maintained within said pneumatic tube, independent of volumetric changes within said pneumatic tube, said changes being generated by movement of the piston.

5. The work table as described in claim 4, wherein the pressure control means comprises:
   a) a valve connected to said pneumatic tube for regulating the flow of compressed air into and out of said pneumatic tube;
   b) a compressed air supply connected to said valve; and
   c) a pressure sensing means for detecting an increase or decrease in the pressure within the pneumatic tube and for regulating the valve.

6. The work table as described in claim 3, wherein said counterbalancing means is connected to the gantry such that the gantry and counterbalancing means translate over said work surface as a single unit.

7. The work table as described in claim 3, wherein the inclined work surface is movable between a first inclined position and a second inclined position.

8. The work table as described in claim 3, wherein said frame comprises a rolling mechanism attached to the base.

9. The work table as described in claim 3, further comprising a device operatively associated with the first and second movement means, for controlling said first and second movement means.

10. The work table as described in claim 9, wherein said device is a computer.

11. The work table as described in claim 9, additionally comprising a third movement means attached to the tool mount for movement of the tool along an axis perpendicular to the work surface.

12. The work table as described in claim 3, wherein said tool is a router.

13. The work table as described in 2, wherein said tool is a router.

14. The work table as described in claim 2, wherein the inclined work surface is movable between a first inclined position and a second inclined position.

15. The work table as described in claim 2, wherein said frame comprises a rolling mechanism attached to the base.

16. The work table as described in claim 2, further comprising a device operatively associated with the first and second movement means, for controlling said first and second movement means.

17. The work table as described in claim 16, wherein said device is a computer.

18. The work table as described in claim 2, additionally comprising a third movement means attached to the tool mount for movement of the tool along an axis perpendicular to the work surface.

* * * * *